May 1, 1951 R. ADLER 2,551,308

ELECTRONIC SYNCHRONIZING APPARATUS

Filed June 21, 1949 2 Sheets-Sheet 1

ROBERT ADLER
*INVENTOR.*

BY Francis W. Crotty
HIS ATTORNEY

May 1, 1951

R. ADLER 2,551,308

ELECTRONIC SYNCHRONIZING APPARATUS

Filed June 21, 1949

2 Sheets-Sheet 2

ROBERT ADLER
*INVENTOR.*

BY Francis W. Crotty

HIS ATTORNEY

Patented May 1, 1951

2,551,308

UNITED STATES PATENT OFFICE 2,551,308

ELECTRONIC SYNCHRONIZING APPARATUS

Robert Adler, Chicago, Ill., assignor to Zenith Radio Corporation, a corporation of Illinois Application June 21, 1949, Serial No. 100,377

11 Claims. (Cl. 250—36)

Figure 1:
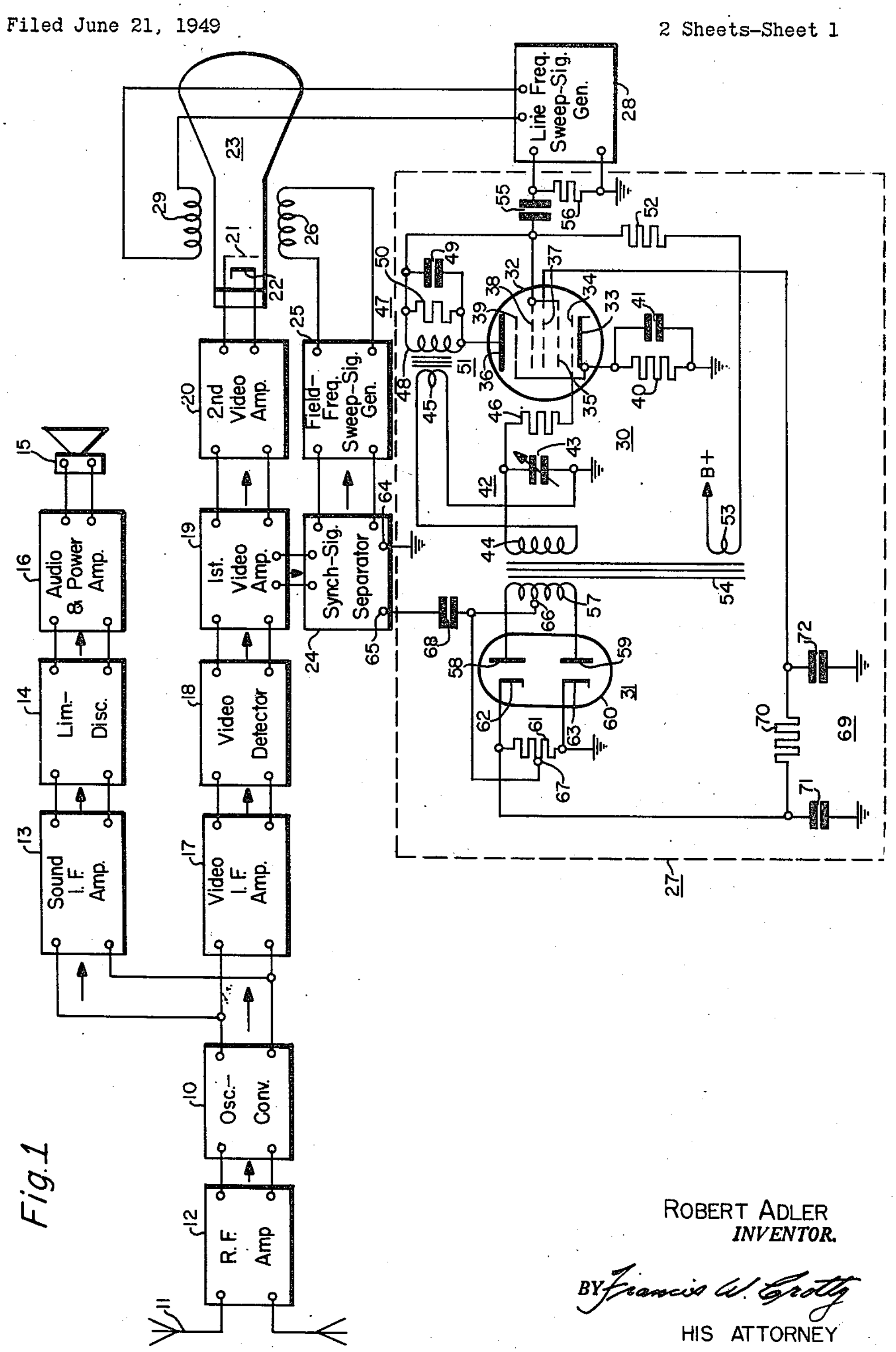

This invention relates to electronic apparatus for synchronizing the scansions of a cathode-ray beam and finds particular utility in television receivers and the like.

A composite television signal as radiated from the transmitter, according to present standards, comprises video-frequency components representing the picture information and synchronizing-signal components indicating the timing of the individual scansions of the image transmitted by the transmitter picture-converting device. For satisfactory reception of such composite television signals, it is necessary that the scansions of the image-reproducing device at the receiver be maintained in synchronism with the transmitted synchronizing-signal components.

One way of achieving this desired result utilizes the received synchronizing-signal components directly to trigger blocking oscillators which, in turn, drive sweep-signal generators associated with the scanning apparatus of the image-reproducing device. This method is conventionally referred to as "triggered synchronization." Systems of this type are subject to undesirable false synchronization because the blocking oscillators, in addition to responding to the received synchronizing-signal pulses, may respond to random noise pulses appearing in the received composite television signal.

Another system for maintaining the scansions of the image-reproducing device in synchronism with the received synchronizing-signal pulses utilizes a synchronized oscillator for driving the line-frequency sweep-signal generator. This system provides improved noise rejection over systems incorporating triggered synchronization. However, there is a phase shift between output pulses and incoming synchronizing-signal pulses, per unit of frequency variation, which increases with improving noise rejection, the two factors being dependent in the same sense on the figure of merit of the synchronized oscillator, so that a compromise between noise rejection and centering stability is required.

Still another system utilizes a line-frequency local oscillator in conjunction with a phase detector for comparing the phase of the locally generated oscillations with that of the incoming synchronizing-signal pulses to derive an automatic frequency control potential which is utilized to alter the frequency of the local oscillator to maintain the output pulses in synchronism with the incoming synchronizing-signal pulses. Such a system affords the advantage of providing separate control over noise rejection and picture centering. However, conventional systems of this type involve relatively complicated circuit arrangements incorporating a separate reactance tube connected between the phase detector and the local oscillator to effect the desired automatic frequency control action.

It is an important object of the present invention to provide improved apparatus for synchronizing the scansions of a cathode-ray beam which affords the advantages of automatic frequency control without the necessity of utilizing a separate reactance tube.

It is a further important object of the invention to provide improved electronic apparatus for developing, in response to incoming control pulses subject to repetition-frequency deviations, an output voltage having a substantially fixed phase relation with respect to the incoming control pulses.

It is another object of the invention to provide improved electronic apparatus responsive to incoming control pulses for providing output pulses of substantially constant amplitude having a substantially fixed phase relation with respect to the incoming control pulses.

It is still another important object of the present invention to accomplish the above mentioned objects with a smaller number of circuit components and at lower cost than in previous systems embodying automatic frequency control.

The present invention provides electronic apparatus for synchronizing the scansions of a cathode-ray beam comprising a source of control pulses having a predetermined nominal repetition frequency. A local oscillator is provided for developing local oscillations and includes an electron discharge device having a cathode, an input electrode, a first anode, a second anode, and a control electrode for controlling the space current distribution between the anodes. A frequency-determining circuit, included in the local oscillator, is coupled to the input electrode and to the cathode and has a natural resonant frequency adjacent to the nominal repetition frequency of the control pulses. A phase detector is coupled to the source of control pulses and to the local oscillator for developing a direct-current control potential which varies in response to variations in the phase relation between the control pulses and the local oscillations. The control potential is applied to the control electrode of the electron discharge device in the local oscillator by coupling means between the phase detector and the control electrode and cathode. A passive network, having a substantially resistive impedance throughout a predetermined frequency range including the nominal repetition frequency, is coupled to at least one of the anodes and to the frequency-determining circuit for developing a signal which varies in magnitude in accordance with variations in the control potential, and for coupling the developed signal into the frequency-determining circuit to introduce a voltage component in quadrature with the circulating current therein, thereby altering the frequency of the local oscillations within the predetermined frequency range to establish and maintain synchronism between the control pulses and the local oscillations. An output voltage having a substantially fixed phase relation with respect to the control pulses is derived by means coupled to the cathode and to at least one of the anodes.

Figure 2:
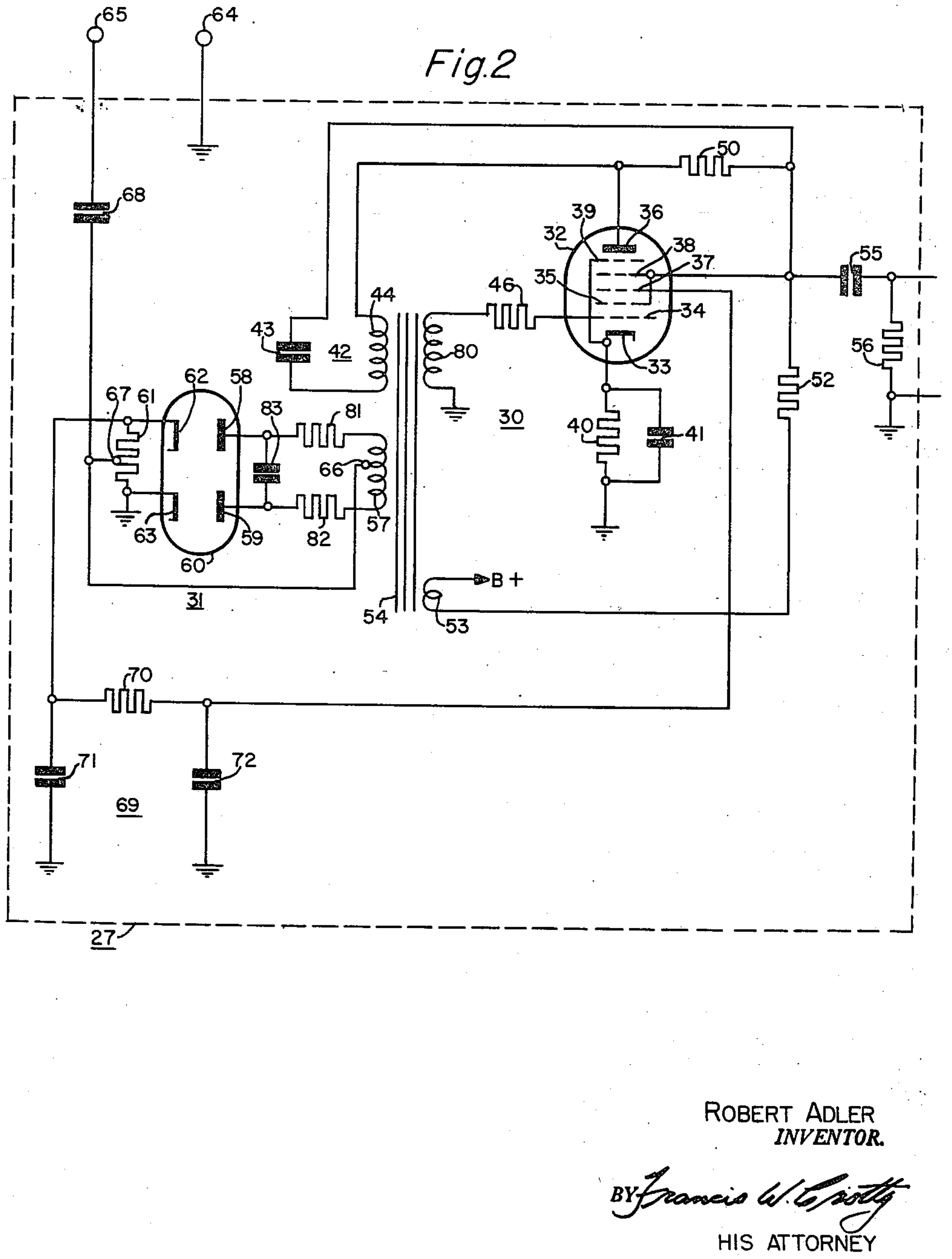

The features of the present invention which are believed to be novel are set forth with particularity in the appended claims. The invention, together with further objects and advantages thereof, may best be understood, however, by reference to the following description taken in connection with the accompanying drawings, in the several figures of which like reference numerals indicate like elements, and in which:

Figure 1 is a schematic representation of a television receiver including synchronizing apparatus constructed in accordance with the present invention, and Figure 2 is a schematic representation of another embodiment of the invention.

The television receiver of Figure 1 comprises an oscillator-converter 10 for converting composite television signals, intercepted by an antenna 11 and amplified by a radio-frequency amplifier 12, to intermediate-frequency sound and video signals. The intermediate-frequency sound signals, after amplification in any desired number of stages of intermediate-frequency amplification 13, are limited and demodulated by a limiter-discriminator 14. The audio-frequency output signals from limiter-discriminator 14 are impressed on a loudspeaker 15 or other sound-reproducing device after amplification in any desired number of stages of audio-frequency and power amplification 16.

The intermediate-frequency composite video signals from oscillator-converter 10 are amplified by any desired number of stages of intermediate-frequency amplification 17 and are demodulated by a video detector 18. The detected composite video signals from video detector 18 are translated through first and second video amplifiers 19 and 20 and are impressed on the input circuit of an image-reproducing device, as for example between the intensity-control grid 21 and the cathode 22 of a cathode-ray tube 23.

Composite video signals from first video amplifier 19 are also applied to a synchronizing-signal separator 24, where the line-frequency synchronizing-signal pulses and the field-frequency synchronizing-signal pulses are separated from the video-frequency components. Field-frequency output pulses from synchronizing-signal separator 24 are applied to a field-frequency sweep-signal generator 25, the output of which is coupled to the appropriate deflection coils 26 associated with image-reproducing device 23.

Line-frequency synchronizing-signal pulses from synchronizing-signal separator 24 are applied to electronic synchronizing apparatus 27 which provides line-frequency output pulses having a substantially fixed phase relation with respect to the line-frequency synchronizing-signal pulses from synchronizing-signal separator 24. Electronic synchronizing apparatus 27 is utilized to drive a line-frequency sweep-signal generator 28 which provides line-frequency deflection current for the appropriate deflection coils 29 associated with image-reproducing device 23.

With the exception of electronic synchronizing apparatus 27, the construction and operation of the receiver of Figure 1 are entirely conventional and therefore need not here be described in detail. The invention is not to be limited to application in a receiver of the type shown in Figure 1, but may be utilized to advantage in any system wherein it is desired to derive from incoming control pulses an output voltage having a substantially fixed phase relation with respect to the incoming control pulses. For example, it is apparent that instead of utilizing a separate sound channel, an inter-carrier sound system may be provided.

Electronic synchronizing apparatus 27 comprises a local oscillator, generally designated by the reference numeral 30, and a phase detector 31 for comparing the phase of the local oscillations from oscillator 30 with that of the incoming control pulses from synchronizing-signal separator 24. Local oscillator 30 comprises an electron-discharge device 32 having a cathode 33, an input electrode 34, a first anode 35, a second anode 36, and a control electrode 37 for controlling the space current distribution between anodes 35 and 36. In the illustrated embodiment, electron-discharge device 32 is of the conventional pentagrid converter type in which first anode 35 is a screen grid and which comprises, in addition to the electrodes mentioned above, a second screen grid 38 and a suppressor grid 39, the latter being connected to cathode 33.

Cathode 33 is connected to ground through a cathode resistor 40, and resistor 40 is bypassed by a condenser 41. Input electrode 34 is coupled to one terminal of a frequency-determining circuit 42 comprising a capacitor 43, an inductor 44, and a winding 45, the other terminal of frequency-determining circuit 42 being grounded. A current-limiting resistor 46 is connected in circuit between input electrode 34 and cathode 33, preferably between input electrode 34 and frequency-determining circuit 42.

A highly damped passive oscillatory circuit 47, having a substantially resistive impedance throughout a predetermined frequency range including the nominal repetition frequency of the incoming control pulses from synchronizing signal separator 24 and comprising an inductor 48, a capacitor 49, and a resistor 50 all connected in parallel, is coupled between anodes 35 and 36. Inductor 48 constitutes the primary winding of a transformer 51 of which coil 45 serves as the secondary winding.

First anode 35 is connected to a suitable source of positive unidirectional operating potential B+ through a load impedance 52, preferably a resistor, and through a tickler coil 53. Tickler coil 53 is tightly coupled to inductor 44 of frequency-determining circuit 42, as by means of a common iron core 54.

Output voltage developed across load impedance 52 is applied to a differentiating circuit comprising a resistor 56, one terminal of which is grounded, and a coupling condenser 55. The terminals of resistor 56 are connected to the line-frequency sweep-signal generator 28.

Inductor 44 of frequency-determining circuit 42 is tightly coupled to a winding 57, the opposite terminals of which are connected to the respective anodes 58 and 59 of a pair of unilaterally conductive devices, here shown as incorporated in a single device 60. A load resistor 61 is connected between the cathodes 62 and 63 of device 60, and cathode 63 is directly connected to ground. One line-frequency output terminal 64 of synchronizing-signal separator 24 is directly connected to ground. The other line-frequency output terminal 65 of synchronizing-signal separator 24 is coupled by means of a condenser 68 to a center tap 66 on winding 57 and to a center tap 67 on resistor 61.

Resistor 61 is coupled to control electrode 37 of device 32 by means of an integrating circuit 69 comprising a series resistor 70 and a pair of shunt condensers 71 and 72.

In operation, frequency-determining circuit 42 is excited into oscillation by feedback of the combined currents flowing to anodes 35 and 36 through resistor 52 to tickler coil 53. The natural resonant frequency of frequency-determining circuit 42 is adjusted to a value adjacent to the nominal repetition frequency of the control pulses from synchronizing-signal separator 24. For example, for operation in accordance with present standards, the nominal repetition frequency of the line-frequency synchronizing-signal pulses is 15,750 cycles per second, and the natural resonant frequency of frequency-determining circuit 42 is set slightly above or below this value. The amount of detuning of the natural resonant frequency of frequency-determining circuit 42 from the nominal repetition frequency of the control pulses is determined by the extent of the maximum frequency range over which automatic frequency control action is desired. For example, if it is desired to provide automatic frequency control action over a maximum range of 200 cycles per second centered about the nominal repetition frequency of the control pulses, the natural resonant frequency of frequency-determining circuit 42 is adjusted to a value 100 cycles per second, or slightly more, above or below the control pulse nominal repetition frequency.

When no composite television signal is intercepted by antenna 11, no control pulses appear at the output of synchronizing-signal separator 24. Consequently, the net control potential applied to control electrode 37 from phase detector 31 is zero. Under this condition, cathode resistor 40 is selected to bias control electrode 37 to the middle of its control range, and frequency-determining circuit 42 is adjusted to oscillate at the nominal repetition frequency of the line-frequency synchronizing-signal pulses.

If, now, the receiver is tuned to an incoming composite television signal, control pulses occurring at a mean frequency corresponding to the nominal repetition frequency appear at output terminals 64, 65 of synchronizing-signal separator 24 and are coupled to phase detector 31. If the instantaneous phase relation between the local oscillations and the control pulses differs from a predetermined desired constant phase relation, a direct current control potential of positive or negative polarity, depending on the direction of phase difference, is developed across resistor 61 and is applied through integrating network 69 to control electrode 37, permitting more or less space current to flow to the second anode 36. The voltage developed across passive network 47, which is in phase with the current to the second anode 36 and therefore also in phase with the voltage across inductor 44, is thereby increased or decreased in response to the potential variations of control electrode 37. This voltage appearing across network 47 causes a voltage component to be induced in winding 45 and introduces in the frequency-determining circuit 42 a voltage component which is in quadrature with the circulating current in that circuit. As a result, the frequency of the local oscillations is altered in a direction to establish synchronism and maintain a substantially fixed phase relation between the control pulses and the local oscillations. Viewed in another way, the effect of inducing a quadrature-phase voltage component across winding 45 from network 47 is the same as if the inductive reactance of the frequency-determining circuit 42 had been altered, and the frequency of oscillation is modified to an extent and in a direction determined by the magnitude and sense of the induced quadrature-phase voltage component.

Variations in the repetition frequency of the control pulses resulting from instability at the transmitter, or variations in the frequency of the local oscillations caused by oscillator drift, result in changes in the phase relation between the incoming control pulses and the local oscillations. Phase detector 31 operates to vary the control potential appearing across resistor 61 in well-known manner to reflect such variations in the phase relation. Thus, the control potential applied to control electrode 37 varies in magnitude in accordance with the variation in phase relation between the control pulses and the local oscillations, and the magnitude of the signal developed across network 47 follows the variations in the control potential applied to control electrode 37. The signal developed across network 47 is coupled into frequency-determining circuit 42 by means of transformer 51 and operates to maintain the local oscillations in synchronism with the incoming control pulses.

The circuit components are preferably adjusted so that the amplitude of the local oscillations across tuning condenser 43 is large, for example 30 or 40 volts. During negative half cycles of the local oscillations, input electrode 34 is driven beyond cut-off, and no voltage is developed across resistor 52 during these intervals. During the positive half cycles, the potential of input electrode 34 is limited to a very small positive value by the action of current-limiting resistor 46. Thus, because the amplitude of the local oscillations is large, a square wave output voltage is developed across load resistor 52. Furthermore, since load resistor 52 is connected in the return circuit for both anodes 35 and 36, the amplitude of the output wave is substantially constant and independent of the potential at control electrode 37. The output wave is differentiated by condenser 55 and resistor 56 to provide sharp pulses for driving the line-frequency sweep-signal generator 28.

When the circuit is connected as shown and described, either one of two possible conditions is obtained depending upon the relative polarities of the primary and secondary windings 45 and 48 of transformer 51. If the relative polarities of these windings are correct, the image reproduced by device 23 assumes a central position on the screen of that device. If, however, the edge of the reproduced image appears at the center of the screen of device 23, the output connections to resistor 61 should be reversed.

The components of integrating circuit 69 are so chosen as to provide ample noise rejection while still insuring that the output pulses remain in synchronism with the control pulses.

The use of a current-limiting resistor 46 connected in series with input electrode 34 affords a very substantial advantage for the present invention over conventional prior art synchronizing apparatus embodying a line-frequency oscillator which employs capacitive coupling to the input electrode. Current-limiting resistor 46 effectively maintains the potential of input electrode 34 at a constant value throughout substantially the entire positive half-cycle of the oscillatory voltage across tuning condenser 43. The output voltage developed across resistor 52 may then be made to approach very closely to a square wave by providing an oscillatory voltage across tuning condenser 43 of amplitude many times greater than the difference between the voltage at which grid-current limiting becomes effective and the cutoff voltage of input electrode 34. In this manner, the positive slopes of the output voltage wave developed across resistor 52, from which positive slopes are derived the output pulses which are used to trigger the line-frequency sweep-signal generator 28, may be made very great, because the time required for the voltage at input electrode 34 to change from grid-current limiting level to cutoff is very short and is determined by the maximum negative slope of the locally generated sinusoidal oscillations. Thus, much more highly accurate phasing of the output pulses used to trigger the line-frequency sweep-signal generator is obtained by using the present invention than has heretofore been obtained by conventional arrangements in which the output voltage pulses are maintained in phase with the peaks or points of minimum slope of the locally generated sinusoidal oscillations.

The differentiating circuit comprising condenser 55 and resistor 56 introduces only a small amount of phase shift. By providing tight coupling between inductors 44 and 57, the oscillator may be so phased that each control pulse occurs at an instant when the local oscillator voltage swings through zero. Thus, for many applications, the amount of phase shift between the control pulses and the output pulses is so slight as to cause substantially no impairment to the operation of the receiver. However, if it is desired to compensate for even this small amount of phase shift, the relative phase between inductor 44 and winding 57 may be adjusted by inserting a phase-shifting network between the terminals of winding 57 and anodes 58 and 59 of device 60. Alternatively, a small negative bias potential may be impressed on input electrode 34 to reduce the conduction period of input electrode 34 and thereby effectively to advance the phase of the positive slopes of the output voltage pulses with respect to the incoming control pulses.

Merely by way of illustration, and in no sense by way of limitation, satisfactory operation of the electronic synchronizing apparatus 27 of the receiver of Figure 1 has been obtained with the following circuit components:

Electron-discharge device 32—type 6BE6
Electron-discharge device 60—type 6AL5
Resistor 40—200 ohms
Resistor 46—100,000 ohms
Resistor 50—3,900 ohms
Resistor 52—5,000 ohms
Resistor 56—18,000 ohms
Resistor 61—1 megohm
Resistor 70—470,000 ohms Condenser 41—0.1 microfarad
Condenser 43—approximately 1,000 micro-microfarads
Condenser 49—0.013 microfarad
Condenser 55—150 micro-microfarads
Condenser 68—470 micro-microfarads
Condenser 71—0.0047 microfarad
Condenser 72—0.047 microfarad
Inductor 44—75 millihenries
Inductor 48—7.5 millihenries
B+—170 volts Transformer 51 may be constructed with a turns ratio between primary winding 48 and secondary winding 45 of 2:1. Tickler coil 53 may be wound with 130 turns, winding 57 with 456 turns, and inductor 44 with 1,900 turns, all on a common iron core 54. Instead of connecting load resistor 52 to one end of inductor 48, resistor 52 may be coupled to a tap provided thereon; in this manner, variations in the space current distribution between the anodes are more effectively utilized in accomplishing the automatic frequency control of the local oscillator 30.

As another alternative, secondary winding 45 may be eliminated by loosely coupling inductor 48 to inductor 44 and by connecting inductor 44 directly across tuning condenser 43. In this manner, the desired automatic-frequency-control action may be effected by reflecting the quadrature-voltage component into frequency-determining circuit 42 through the medium of magnetic field interaction between inductors 48 and 44.

The embodiment of Figure 2 is similar in many respects to that of Figure 1; however, the requirement for transformer 51 is eliminated by connecting inductor 44 and capacitor 43 of the frequency-determining circuit 42 in series between anodes 35 and 36 and by providing a winding 80, tightly coupled to inductor 44, between input electrode 34 and ground. In addition, a phase-correction network, comprising series resistors 81 and 82 and shunt condenser 83, is provided between the terminals of inductor 57 and anodes 58 and 59 of device 60.

The operation of the arrangement of Figure 2 is fundamentally the same as that of the arrangement of Figure 1. Oscillations are produced in frequency-determining circuit 42 by virtue of the feedback through tickler coil 53 and the tight coupling furnished by common iron core 54 between tickler coil 53 and inductors 44 and 80. The control potential is developed across resistor 61 in the same manner as in the embodiment of Figure 1, with the exception that resistors 81 and 82 and condenser 83 operate to introduce a slight substantially constant delay between the local oscillations and the corresponding voltage appearing at anodes 58 and 59 of device 60. Since the positive voltage output pulses developed across output resistor 52 are initiated by the negative slopes of the local oscillator voltage through zero, the delay introduced by resistors 81 and 82 and condenser 83 operates effectively to advance the output pulses with respect to the control pulses to compensate for any slight phase delay which may be present between the output pulses and the initiation of the sweep-signal by generator 28. The control potential applied to control electrode 37 from resistor 61 operates to vary the voltage developed across resistor 50, which variations in turn are reflected as changes in the quadrature voltage component in frequency-determining circuit 42, thereby altering the oscillation frequency to establish synchronism and maintain a substantially fixed phase relation between the local oscillations and the control pulses.

Thus, the present invention provides improved electronic synchronizing apparatus particularly suited for use in television receivers. A single electron-discharge device is used to replace the conventional combination of a reactance tube and an oscillator tube, thus reducing the cost of the receiver as well as introducing novel simplification. This reduction in cost and simplification are accomplished without sacrificing any of the advantages of automatic-frequency-control action. Furthermore, by using a current-limiting resistor in the input circuit of the local oscillator, sharper pulses for driving the sweep-signal generator may be obtained than by using conventional oscillators having a grid leak resistor and a grid coupling condenser.

While particular embodiments of the present invention have been shown and described, it is apparent that various changes and modifications may be made, and it is therefore contemplated in the appended claims to cover all such changes and modifications as fall within the true spirit and scope of the invention.

I claim:

1. Electronic apparatus for synchronizing the scansions of a cathode-ray beam comprising: a source of control pulses having a predetermined nominal repetition frequency; a local oscillator for developing local oscillations including an electron-discharge device having a cathode, an input electrode, a first anode, a second anode, and a control electrode for controlling the space current distribution between said anodes; a frequency-determining circuit included in said local oscillator, coupled to said input electrode and to said cathode, and having a natural resonant frequency adjacent to said nominal repetition frequency; a phase detector coupled to said source and to said oscillator for developing a direct-current control potential which varies in response to variations in the phase relation between said control pulses and said local oscillations; means for coupling said phase detector to said control electrode and to said cathode to apply said control potential to said control electrode; a passive network having a substantially resistive impendance throughout a predetermined frequency range including said nominal repetition frequency and coupled to at least one of said anodes for developing a signal which varies in magnitude in accordance with variations in said control potential and associated with said frequency-determining circuit for coupling said signal into said frequency-determining circuit to introduce a voltage component in quadrature with the circulating current therein to alter the frequency of said oscillations within said frequency range to establish synchronism between said control pulses and said local oscillations; and means coupled to said cathode and to at least one of said anodes for deriving an output voltage having a substantially fixed phase relation with respect to said control pulses.

2. Electronic apparatus for synchronizing the scansions of a cathode-ray beam comprising: a source of control pulses having a predetermined nominal repetition frequency; a local oscillator for developing local oscillations including an electron-discharge device having a cathode, an input grid, a screen grid, an anode, and a control grid disposed between said screen grid and said anode for controlling the space current distribution between said screen grid and said anode; a frequency-determining circuit included in said local oscillator, coupled to said input grid and to said cathode, and having a natural resonant frequency adjacent to said nominal repetition frequency; a phase detector coupled to said source and to said oscillator for developing a direct-current control potential which varies in response to variations in the phase relation between said control pulses and said local oscillations; means for coupling said phase detector to said control grid and to said cathode to apply said control potential to said control grid; a passive network having a substantially resistive impedance throughout a predetermined frequency range including said nominal repetition frequency and coupled to at least one of said screen grid and said anode for developing a signal which varies in magnitude in accordance with said control potential and associated with said frequency-determining circuit for coupling said signal into said frequency-determining circuit to introduce a voltage component in quadrature with the circulating current therein to alter the frequency of said oscillations within said frequency range to establish and maintain synchronism between said control pulses and said local oscillations; and means coupled to said cathode and to at least one of said screen grid and said anode for deriving an output voltage having a substantially fixed phase relation with respect to said control pulses.

3. Electronic apparatus for synchronizing the scansions of a cathode-ray beam comprising: a source of control pulses having a predetermined nominal repetition frequency; a local oscillator for developing local oscillations including an electron-discharge device having a cathode, an input electrode, a first anode, a second anode, and a control electrode for controlling the space current distribution between said anodes; a frequency-determining circuit included in said local oscillator, coupled to said input electrode and to said cathode, and having a natural resonant frequency adjacent to said nominal repetition frequency; a phase detector coupled to said source and to said oscillator for developing a direct-current control potential which varies in response to variations in the phase relation between said control pulses and said local oscillations; a phase-correction network coupled between said local oscillator and said phase detector; means for coupling said phase detector to said control electrode and to said cathode to apply said control potential to said control electrode; a passive network having a substantially resistive impedance throughout a predetermined frequency range including said nominal repetition frequency and coupled to at least one of said anodes for developing a signal which varies in magnitude in accordance with variations in said control potential and associated with said frequency-determining circuit for coupling said signal into said frequency-determining circuit to introduce a voltage component in quadrature with the circulating current therein to alter the frequency of said oscillations within said frequency range to establish and maintain synchronism between said control pulses and said local oscillations; and means coupled to said cathode and to at least one of said anodes for deriving an output voltage having a substantially fixed phase relation with respect to said control pulses.

4. Electronic apparatus for synchronizing the scansions of a cathode ray beam comprising: a source of control pulses having a predetermined nominal repetition frequency; a local oscillator for developing local oscillations including an electron-discharge device having a cathode, an input electrode, a first anode, a second anode, and a control electrode for controlling the space current distribution between said anodes; a frequency-determining circuit included in said local oscillator, coupled to said input electrode and to said cathode, and having a natural resonant frequency adjacent to said nominal repetition frequency; a phase detector coupled to said source and to said oscillator for developing a direct-current control potential which varies in response to variations in the phase relation between said control pulses and said local oscillations; an integrating circuit for coupling said phase detector to said control electrode and to said cathode to apply said control potential to said control electrode; a passive network having a substantially resistive impedance throughout a predetermined frequency range including said nominal repetition frequency and coupled to at least one of said anodes for developing a signal which varies in magnitude in accordance with variations in said control potential and associated with said frequency-determining circuit for coupling said signal into said frequency-determining circuit to introduce a voltage component in quadrature with the circulating current therein to alter the frequency of said oscillations within said frequency range to establish and maintain synchronism between said control pulses and said local oscillations; and means coupled to said cathode and to at least one of said anodes for deriving an output voltage having a substantially fixed phase relation with respect to said control pulses.

5. Electronic apparatus for synchronizing the scansions of a cathode-ray beam comprising: a source of control pulses having a predetermined nominal repetition frequency; a local oscillator for developing local oscillations including an electron-discharge device having a cathode, an input electrode, a first anode, a second anode, and a control electrode for controlling the space current distribution between said anodes; a frequency-determining circuit included in said local oscillator, coupled to said input electrode and to said cathode, and having a natural resonant frequency adjacent to said nominal repetition frequency; a phase detector coupled to said source and to said oscillator for developing a direct-current control potential which varies in response to variations in the phase relation between said control pulses and said local oscillations; means for coupling said phase detector to said control electrode and to said cathode to apply said control potential to said control electrode; a passive network having a substantially resistive impedance throughout a predetermined frequency range including said nominal repetition frequency and coupled between said anodes for developing a signal which varies in magnitude in accordance with said control potential and associated with said frequency-determining circuit for coupling said signal into said frequency-determining circuit to introduce a voltage component in quadrature with the circulating current therein to alter the frequency of said oscillations within said frequency range to establish and maintain synchronism between said control pulses and said local oscillations; and means coupled to said cathode and to at least one of said anodes for deriving an output voltage having a substantially fixed phase relation with respect to said control pulses.

6. Electronic apparatus for synchronizing the scansions of a cathode-ray beam comprising: a source of control pulses having a predetermined nominal repetition frequency; a local oscillator for developing local oscillations including an electron-discharge device having a cathode, an input electrode, a first anode, a second anode, and a control electrode for controlling the space current distribution between said anodes; a frequency-determining circuit included in said local oscillator, coupled to said input electrode and to said cathode, and having a natural resonant frequency adjacent to said nominal repetition frequency; a phase detector coupled to said source and to said oscillator for developing a direct-current control potential which varies in response to variations in the phase relation between said control pulses and said local oscillations; means for coupling said phase detector to said control electrode and to said cathode to apply said control potential to said control electrode; a highly damped passive oscillatory circuit having a substantially resistive impedance throughout a predetermined frequency range including said nominal repetition frequency and coupled to at least one of said anodes for deriving a signal which varies in magnitude in accordance with said control potential and associated with said frequency-determining circuit for coupling said signal into said frequency-determining circuit to introduce a voltage component in quadrature with the circulating current therein to alter the frequency of said oscillations within said frequency range to establish and maintain synchronism between said control pulses and said local oscillations; and means coupled to said cathode and to at least one of said anodes for deriving an output voltage having a substantially fixed phase relation with respect to said control pulses.

7. Electronic apparatus for synchronizing the scansions of a cathode-ray beam comprising: a source of control pulses having a predetermined nominal repetition frequency; a local oscillator for developing local oscillations including an eelctron-discharge device having a cathode, an input electrode, a first anode, a second anode, and a control electrode for controlling the space current distribution between said anodes; a frequency-determining circuit included in said local oscillator, coupled to said input electrode and to said cathode, and having a natural resonant frequency adjacent to said nominal repetition frequency; a phase detector coupled to said source and to said oscillator for developing a direct-current control potential which varies in response to variations in the phase relation between said control pulses and said local oscillations; means for coupling said phase detector to said control electrode and to said cathode to apply said control potential to said control electrode; a transformer having a primary winding and a secondary winding; a highly damped passive oscillatory circuit including said primary winding and having a substantially resistive impedance throughout a predetermined frequency range including said nominal repetition frequency and coupled between said anodes for developing a signal which varies in magnitude in accordance with said control potential; means for coupling said secondary winding in series in said frequency-determining circuit to introduce a voltage component in quadrature with the current therein to alter the frequency of said oscillations within said frequency range to establish and maintain synchronism between said control pulses and said local oscillations; and means coupled to said cathode and to at least one of said anodes for deriving an output voltage having a substantially fixed phase relation with respect to said control pulses.

8. Electronic apparatus for synchronizing the scansions of a cathode-ray beam comprising: a source of control pulses having a predetermined nominal repetition frequency; a local oscillator for developing local oscillations including an electron-discharge device having a cathode, an input electrode, a first anode, a second anode, and a control electrode for controlling the space current distribution between said anodes; a frequency-determining circuit included in said local oscillator, coupled to said input electrode and to said cathode, and having a natural resonant frequency adjacent to said nominal repetition frequency; a phase detector coupled to said source and to said oscillator for developing a direct-current control potential which varies in response to variations in the phase relation between said control pulses and said local oscillations; means for coupling said phase detector to said control electrode and to said cathode to apply said control potential to said control electrode; a passive network having a substantially resistive impedance throughout a predetermined frequency range including said nominal repetition frequency and coupled to at least one of said anodes for developing a signal which varies in magnitude in accordance with variations in said control potential and associated with said frequency-determining circuit for coupling said signal into said frequency-determining circuit to introduce a voltage component in quadrature with the circulating current therein to alter the frequency of said oscillations within said frequency range to establish and maintain synchronism between said control pulses and said local oscillations; a current limiting resistor connected in circuit between said input electrode and said cathode; and means coupled to said cathode and to at least one of said anodes for deriving an output voltage having a substantially fixed phase relation with respect to said control pulses.

9. Electronic apparatus for synchronizing the scansions of a cathode-ray beam comprising: a source of control pulses having a predetermined nominal repetition frequency; a local oscillator for developing local oscillations including an electron-discharge device having a cathode, an input electrode, a first anode, a second anode, and a control electrode for controlling the space current distribution between said anodes; a frequency-determining circuit included in said local oscillator, coupled to said input electrode and to said cathode, and having a natural resonant frequency adjacent to said nominal repetition frequency; a phase detector coupled to said source and to said oscillator for developing a direct-current control potential which varies in response to variations in the phase relation between said control pulses and said local oscillations; means for coupling said phase detector to said control electrode and to said cathode to apply said control potential to said control electrode; a resistor coupled between said anodes and in series in said frequency-determining circuit for developing a signal which varies in magnitude in accordance with variations in said control potential and associated with said frequency-determining circuit for coupling said signal into said frequency-determining circuit to introduce a voltage component in quadrature with the circulating current therein to alter the frequency of said oscillations within said frequency range to establish and maintain synchronism between said control pulses and said local oscillations; and a load impedance coupled to one of said anodes and to said cathode for deriving an output voltage having a substantially fixed phase relation with respect to said control pulses.

10. Electronic apparatus for synchronizing the scansions of a cathode-ray beam comprising: a source of control pulses having a predetermined nominal repetition frequency; a local oscillator for developing local oscillations including an electron-discharge device having a cathode, an input electrode, a first anode, a second anode, and a control electrode for controlling the space current distribution between said anodes; a frequency-determining circuit included in said local oscillator, coupled to said input electrode and to said cathode, and having a natural resonant frequency adjacent to said nominal repetition frequency; a phase detector coupled to said source and to said oscillator for developing a direct-current control potential which varies in response to variations in the phase relation between said control pulses and said local oscillations; means for coupling said phase detector to said control electrode and to said cathode to apply said control potential to said control electrode; a passive network having a substantially resistive impedance throughout a predetermined frequency range including said nominal repetition frequency and coupled between said anodes for developing a signal which varies in magnitude in accordance with said control potential and associated with said frequency-determining circuit for coupling said signal into said frequency-determining circuit to introduce a voltage component in quadrature with the circulating current therein to alter the frequency of said oscillations within said frequency range to establish and maintain synchronism between said control pulses and said local oscillations; and a load resistor coupled to both of said anodes and to said cathode for deriving output voltage pulses of substantially constant amplitude having a substantially fixed phase relation with respect to said control pulses.

11. Electronic apparatus for synchronizing the scansions of a cathode-ray beam comprising: a source of control pulses having a predetermined nominal repetition frequency; a local oscillator for developing local oscillations including an electron-discharge device having a cathode, an input grid, a screen grid, an anode, and a control grid for controlling the space current distribution between said screen grid and said anode; a frequency-determining circuit included in said local oscillator, coupled to said input grid and to said cathode, and having a natural resonant frequency adjacent to said nominal repetition frequency; a phase detector coupled to said source and to said frequency determining circuit for developing a direct-current control potential which varies in response to variations in the phase relation between said control pulses and said local oscillations; an integrating circuit for coupling said phase detector to said control grid and to said cathode to apply said control potential to said control grid; a transformer having a primary winding and a secondary winding; a highly damped passive oscillatory circuit including said primary winding and having a substantially resistive impedance throughout a predetermined frequency range including said nominal repetition frequency and coupled between said screen grid and said anode for developing a signal which varies in magnitude in accordance with said control potential; means for coupling said secondary winding in series in said frequency-determining circuit to introduce a voltage component in quadrature with the circulating current therein to alter the frequency of said oscillations within said frequency range to establish and maintain synchronism between said control pulses and said local oscillations; a current limiting resistor connected in circuit between said input grid and said cathode; and a load resistor coupled to said screen grid, to said anode and to said cathode for deriving output voltage pulses of substantially constant apmlitude having a substantially fixed phase relation with respect to said control pulses.

ROBERT ADLER.

No references cited.